(12) United States Patent
Banerjee et al.

(10) Patent No.: US 9,794,289 B1
(45) Date of Patent: Oct. 17, 2017

(54) APPLYING SECURITY POLICIES BASED ON CONTEXT OF A WORKLOAD

(71) Applicant: Symantec Corporation, Mountain View, CA (US)

(72) Inventors: Deb Banerjee, Cupertino, CA (US); Sheetal Venkatesh Yelimeli, Pune (IN); Smita Gadre, Pune (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/266,585

(22) Filed: Apr. 30, 2014

Related U.S. Application Data

(60) Provisional application No. 61/978,677, filed on Apr. 11, 2014.

(51) Int. Cl.
*H04L 29/06* (2006.01)
(52) U.S. Cl.
CPC ............ *H04L 63/20* (2013.01); *H04L 63/145* (2013.01)
(58) Field of Classification Search
CPC .............................. H04L 63/20; H04L 63/145
USPC ............................................. 726/1, 226, 201
See application file for complete search history.

(56) References Cited

U.S. PATENT DOCUMENTS

| 7,891,001 | B1* | 2/2011 | Greenawalt et al. ............ 726/22 |
| 2005/0055578 | A1* | 3/2005 | Wright et al. ................. 713/201 |
| 2006/0010491 | A1* | 1/2006 | Prigent ............. H04L 12/40104 726/11 |
| 2006/0075466 | A1* | 4/2006 | Ramanathan ....... H04L 41/0893 726/1 |
| 2008/0109871 | A1* | 5/2008 | Jacobs ............................. 726/1 |
| 2009/0077621 | A1* | 3/2009 | Lang et al. ....................... 726/1 |
| 2011/0072514 | A1* | 3/2011 | Gilder .................. G09G 3/3208 726/22 |
| 2014/0181888 | A1* | 6/2014 | Li ........................... G06F 21/62 726/1 |
| 2015/0106909 | A1* | 4/2015 | Chen ................... H04L 63/0272 726/12 |

* cited by examiner

*Primary Examiner* — John B King
(74) *Attorney, Agent, or Firm* — Wilmer Cutler Pickering Hale and Dorr LLP

(57) ABSTRACT

A workload to be provided by one or more network resources may be identified. The workload may be analyzed to determine one or more attributes of the workload. Furthermore, a general policy may be identified based on the one or more attributes of the workload. One or more security policies may be applied to a network resource that provides the workload. The one or more security policies may satisfy one or more requirements of the general policy.

15 Claims, 5 Drawing Sheets

APPLYING SECURITY POLICIES BASED ON CONTEXT OF A WORKLOAD

RELATED APPLICATION

This application claims the benefit under 35 U.S.C. §119 (e) of U.S. Provisional Application 61/978,677 filed on Apr. 11, 2014.

TECHNICAL FIELD

The present disclosure relates to security policies, and more particularly, applying security policies based on the context of a workload.

BACKGROUND

Regulations may require certain requirements associated with particular types of data. For example, types of data may include identifying information, healthcare records, and financial information. Each type of data may be subject to requirements of certain regulations. As an example, identifying information may include personally identifiable information (PII) that may be subject to certain privacy and information security rules and regulations. Furthermore, healthcare records may be subject to other regulations that are part of the Health Insurance Portability and Accountability Act (HIPAA). Additionally, financial information may be subject to regulations associated with the Payment Card Industry Data Security Standard (PCI DSS).

A data center may be used to provide access to such types of data that may be subject to such regulations. Accordingly, the data center may be required to adhere to particular regulations depending on the type of data that the data center is providing or using.

BRIEF DESCRIPTION OF THE DRAWINGS

The present disclosure will be understood more fully from the detailed description given below and from the accompanying drawings of various implementations of the disclosure.

SUMMARY

Figure 1:
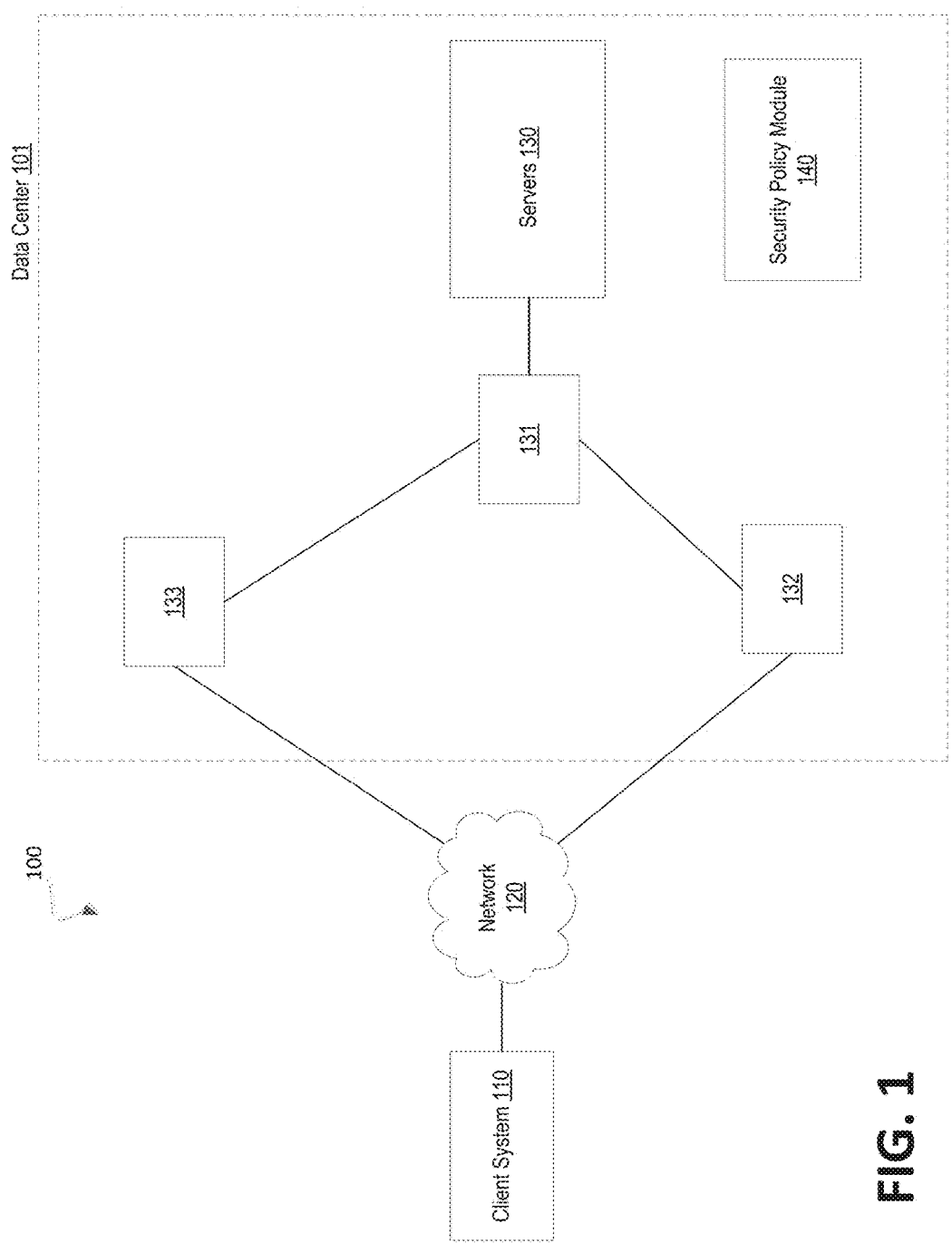
FIG. 1 illustrates an example system architecture in accordance with various implementations.

A workload to be provided by one or more network resources may be identified. The workload may be analyzed to determine one or more attributes of the workload. A general policy may be identified based on the determined one or more attributes of the workload. Furthermore, one or more security policies to apply to the one or more network resources that provide the workload may be determined. The one or more security policies may satisfy one or more requirements associated with the identified general policy.

In some embodiments, the analyzing of the workload to determine the one or more attributes of the workload may comprise identifying a type of data associated with the workload, and the general policy may be identified based on the type of data associated with the workload.

In some embodiments, the one or more attributes may comprise a geographical location associated with the workload. In the same or alternative embodiments, the one or more security policies may comprise at least one of a network security policy, data policy, or a malware policy.

In some embodiments, the identified workload has not yet been provided by the one or more network resources.

In some embodiments, the identifying of the general policy based on the determined one or more attributes of the workload may include matching one or more conditions associated with the general policy with at least one attribute of the one or more attributes of the workload.

In some embodiments, the determined one or more security policies may be applied to the one or more network resources that provide the workload. The applying of the determined one or more security policies may modify a configuration of the one or more network resources that provide the workload to satisfy the one or more requirements associated with the general policy.

DETAILED DESCRIPTION

Described herein is the application of security policies based on the context of a workload. In some embodiments, a workload may refer to an application or service that is either provided by a data center or will be provided by a data center. For example, one or more network resources of the data center may be used in the providing of the application or service. Examples of the network resources include, but is not limited to, network servers such as a web servers, storage servers, database servers, load balancing servers, storage devices, and the like. Thus, the network resources may include a set of machines (e.g., servers) that are used to form or provide the workload. Examples of a workload include, but are not limited to, software applications or web services that are provided to one or more users.

In some embodiments, the workload may be analyzed to identify attributes associated with the workload. Such attributes may be referred to as the context of the workload. An example of an attribute associated with a work load includes the type of data used or accessed by the workload. For example, types of data that are used by the workload or are provided by the workload may be identified from the analysis of the workload. The types of data may include, but are not limited to, financial data, healthcare data, and personal data. In some embodiments, the type of data that is used by the workload or is provided by the workload may require the implementation of a regulation or general policy to be applied to the workload. Such data may be referred to as restricted data as the data may be subject to such regulations. For example, if financial data is used by the workload or provided by the workload then the workload may need to comply with regulations associated with the PCI standard. Furthermore, if electronic healthcare data is used by the workload or provided by the workload then the workload may need to comply with regulations associated with HIPAA. Additionally, if personal data is used by the workload or provided by the workload then the workload may need to comply with regulations associated with the PII standard. Thus, an attribute (e.g., a type of data or another type of attribute as described in further detail below) of the workload and a regulation (also referred to as a general policy) required by the type of data used by the workload may be identified.

In some embodiments, the regulation or general policy required by the type of data used by the workload may be translated or mapped to one or more security policies. The security policies that are translated to or mapped from the regulation or general policy may be security policies that may be required to satisfy the regulation or the general policy. In the same or alternative embodiments, a security policy may refer to a security mechanism or protocol that is provisioned to or implemented on a network resource (e.g., a server) that provides a workload or forms the workload. The security policy may determine or influence some behavior of the network resource.

The security policies that are required to satisfy a regulation or general policy that matches attributes identified from the context of a workload may be applied or provisioned to network resources that provide the workload.

Implementations of the present disclosure may include a security policy module, which is described in further detail below, to apply security policies based on a context of a workload. For example, the security policy module may identify a workload, analyze the workload to identify attributes of the workload, determine a regulation or general policy that matches one or more attributes of the workload, and implement or provision security policies that will satisfy the regulation or security policy to network resources that provide the workload. The features of the security policy module, which are described in further detail below, may include a workload identifier sub-module, an attributes analyzer sub-module, a general policy identifier sub-module, a security policy translator sub-module, a security policy provisioning sub-module, and a policies sub-module.

FIG. 1 is an example system architecture 100 for various implementations of the disclosure. The system architecture 100 may include server systems 130, 131, 132, and 133 and a client system 110 that are coupled via a network 120. The network 120 may be a public network (e.g., the Internet), a private network (e.g., a local area network (LAN) or a wide area network (WAN)), or a combination thereof. Network 120 may include a wireless infrastructure, which may be provided by one or multiple wireless communications systems, such as a Wi-Fi hotspot, connected with the network 120 and/or a wireless carrier system that may be implemented using various data processing equipment, communication towers, etc.

Server systems 130, 131, 132, and 133 may each be a network resource of a data center 101. In some embodiments, each of the server systems 130, 131, 132, and 133 may each be a computing device (e.g., a server machine, a router, personal computer, etc.) that may provide at least some functionality related to a workload that is to be provided by the data center 101. The server systems 130, 131, 132, and 133 may be referred to as network resources. For example, the sever systems 130, 131, 132, and 133 may include, but are not limited to, a web server, an application server, a storage server, and a load balancing server. In some embodiments, the server systems 130, 131, 132, and 133 may provide or enable a workload. For example, the server systems 130, 131, 132, and 133 may provide functionality to provide or support the workload to be accessed or used by users.

In some embodiments, the data center 101 may include a security policy module 140 that may apply one or more security policies to the server systems 130, 131, 132, and 133 based on a context of a workload. For example, the security policy module 140 may analyze a workload that is to be provisioned at the data center 101, identify attributes of the data, determine a regulation associated with the identified attributes of the workload, and apply one or more security policies to the servers 130, 131, 132, and 133 in order to satisfy requirements of the regulation.

In the same or alternative embodiments, the security policy module 140 may identify the network resources that will be used to provide a workload and apply security policies to satisfy the regulation or general policy based on the context of the workload. For example, the security policy module 140 may identify one or more network resources that will be used to provide the workload where the one or more identified network resources are a subset of the total network resources of the data center 101. For example, the security policy module 140 may identify that the servers 130 and 131 will be used to provide a first workload and that the first workload is associated with a first regulation that will require a first security policy and a second security policy. Furthermore, the security policy module 140 may further identify that the servers 131, 132 and 133 will be used to provide a second workload and that the second workload is associated with a second regulation that will require a third security policy. Thus, in some embodiments, the security policy module 140 may apply the first security policy and the second security policy to the servers 130 and 131 to satisfy the first regulation and the security policy module 140 may further apply the third security policy to the servers 131, 132, and 133 to satisfy the second regulation.

Client system 110 may be any computing device (e.g., a server machine, a router, a personal computer, a mobile device, etc.) that may represent a user device or a server. In some embodiments, the client system 110 may access a workload that is provided by the data center 101. Furthermore, in some embodiments, the security policies applied to network resources that provide a workload may limit or determine how the client system 110 may use or interact with the workload.

Figure 2:
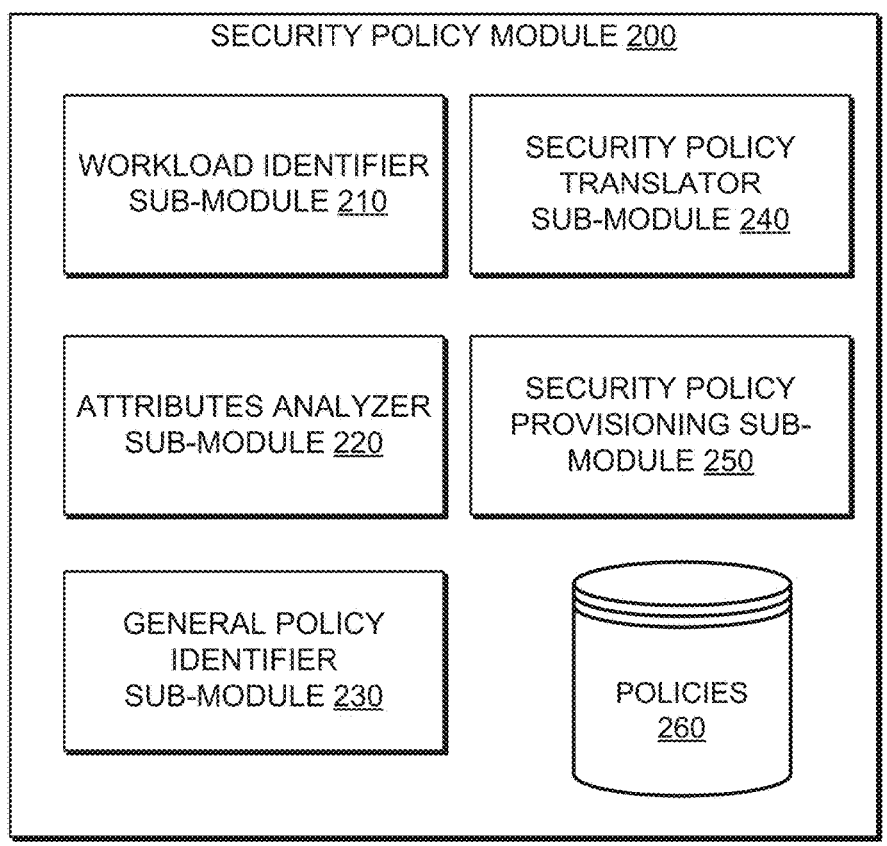
FIG. 2 is a block diagram of an example security policy module in accordance with some embodiments of the present disclosure.

FIG. 2 is a block diagram of a security policy module 200 in accordance with some embodiments. In general, the security policy module 200 may correspond to the security policy module 140 as shown in FIG. 1. The security policy module 200 may include a workload identifier sub-module 210, an attributes analyzer sub-module 220, a general policy identifier sub-module 230, a security policy translator sub-module 240, a security policy provisioning sub-module 250, and a policies sub-module 260.

As shown in FIG. 2, the mask module 200 may include a workload identifier sub-module 210. In some embodiments, the workload identifier sub-module 210 may identify a workload. For example, the workload identifier sub-module 210 may receive an indication of a workload to be provisioned within a data center. Thus, the workload identifier sub-module 210 may receive or identify a workload that has not yet been provisioned by the data center and is currently not provided by any network resources of the data center. In alternative embodiments, the workload identifier sub-module 210 may identify an existing workload that is currently provisioned by the data center and is currently provided by one or more network resources of the data center.

The security policy module 200 may further include an attributes analyzer sub-module 220. In some embodiments, the attributes analyzer sub-module 220 may identify one or more attributes associated with a workload. For example, the attributes analyzer sub-module 220 may identify one or more attributes associated with the workload that is received or identified by the workload identifier sub-module 210. In some embodiments, the attributes may be identified from a context of the workload. For example, the attributes may include, but are not limited to, types of data used or provided by the workload, a geographical location associated with the workload, a type of network associated with the workload, a business organization associated with the workload, a type of application or service provided by the workload, etc. Further details with regard to the attributes that make up the context of a workload are disclosed in further detail below with regard to FIGS. 3-4. In some embodiments, the attributes analyzer sub-module 220 may scan data or information associated with the workload to identify the attributes of the workload. Furthermore, in the same or alternative embodiments, the attributes analyzer sub-module 220 may prompt a user or administrator initiating a workload to be provisioned with a series of questions with regard to the context of the workload that the user or administrator is seeking to provision. For example, the questions may include an identification if the data is sensitive data or is not sensitive data, an identification of the type of data (e.g., personal data, financial data, healthcare data, etc.), a geographical location, and so forth.

Returning to FIG. 2, the security policy module 200 may include a general policy identifier sub-module 230. In some embodiments, a general policy may be referred to as a regulation. The general policy identifier sub-module 230 may identify a general policy (i.e., regulation) that is associated with the context of the workload that is to be provisioned or has been provisioned. For example, the general policy identifier sub-module 230 may receive the attributes identified by the attributes analyzer sub-module 220 and may determine if a general policy matches the attributes of the workload. Examples of a general policy include, but are not limited to, personally identifiable information (PII) standard or regulation, Health Insurance Portability and Accountability Act (HIPAA) regulations, and Payment Card Industry Data Security Standard (PCI DSS). Thus, a general policy may be a regulation. However, in the same or alternative embodiments, the general policy may be an organizational standard (e.g., an IT standard such as a server security policy, data encryption policy, or any policy configured or set by an administrator for an organization) or a general best practice that is followed by a business organization (e.g., servers in a demilitarized zone or perimeter network that may require more protection than servers inside a company network). Thus, in some embodiments, the general policy may be specified based on an organizational need or practices.

The security policy module 200 may further include a security policy translator sub-module 240. In some embodiments, the security policy translator sub-module 240 may receive the general policy or regulation identified by the general policy identifier sub-module 230 and may translate or map the general policy to one or more security policies. For example, the security policy translator sub-module 240 may identify one or more security policies that need to be implemented or provisioned on one or more network resources that provide a workload so that the network resources that provide the workload may satisfy the requirements of the general policy or regulation. Thus, the general policy or regulation that is identified based on the attributes or context of a workload may be translated or mapped to lower level security policies that may be applied or provisioned to network resources that are to provide the workload.

Returning to FIG. 2, the security policy module 200 may further include a security policy provisioning sub-module 250. In some embodiments, the security policy provisioning sub-module 250 may apply or provision security policies to network resources of a data center. For example, the security policy provisioning sub-module 250 may apply or provision one or more security policies that are necessary to satisfy or comply with a general policy. The security policy module 200 may further include a policies sub-module 260. In some embodiments, the policies sub-module 260 may store one or more security policies and one or more general policies. For example, in some embodiments, the policies sub-module 260 may store a general policy, the requirements of the general policy, and mapping or translation information to relate the general policy to one or more security policies that need to be implemented to satisfy or comply with the general policy.

Figure 3:
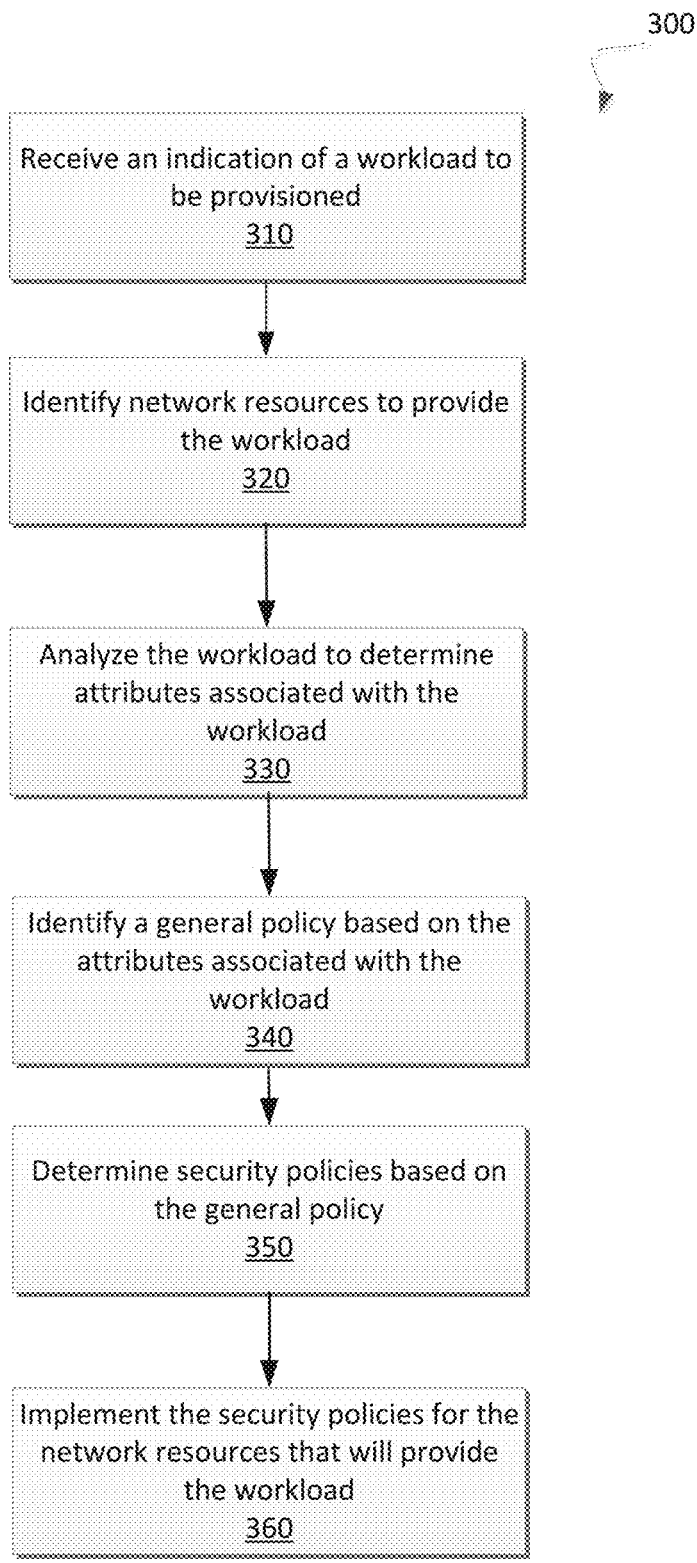
FIG. 3 is a flow diagram of an example method to apply or provision security policies based on context of a workload in accordance with some embodiments.

FIG. 3 is a flow diagram illustrating an example method 300 to apply or provision security policies based on the context of a workload. The method 300 may be performed by processing logic that may comprise hardware (e.g., a processing device, circuitry, dedicated logic, programmable logic, microcode, etc.), software (e.g., instructions run on a processing device), or a combination thereof. In some embodiments, the method 300 may be performed by a security policy module 140 of FIG. 1 or a security policy module 200 of FIG. 2.

As shown in FIG. 3, the method 300 may begin by the processing logic receiving an indication of a workload to be provisioned (block 310). For example, the processing logic may receive an indication of a workload to be provisioned or provided by one or more network resources of a data center. The processing logic may further identify the network resources that are to provide the workload (block 320). For example, the processing logic may identify a subset of the network resources of the data center that are needed or will be assigned to provide the workload. The processing logic may further analyze the workload to determine attributes associated with the workload (block 330). In some embodiments, the attributes of the workload may be referred to as a context of the workload. As previously described, the attributes may include a type of data used or provided by the workload, a geographical location associated with the workload, a type of network associated with the workload, a business organization associated with the workload, a type of application or service provided by the workload, etc. For example, the type of data of a workload may identify the data that the workload uses or the data that the workload may provide to other users. The type of network associated with the workload may identify whether the network in which the workload resides is a private network (e.g., the network is not accessible by public users and thus public users may not access the workload) or if the network is a public network (e.g., the network may be accessible by the public users and thus the workload may be accessible by public users.). Additionally, the geographical location associated with the workload may identify either a location of the network resources that provide the workload and/or a location of users who may access the workload. Furthermore, the business organization associated with the workload may identify a particular business organization that will use the workload (e.g., a research and development organization, a sales organization, etc.) and the type of application or service provided by the workload may identify an application or service such as a web service, an application (e.g., SharePoint), etc.

Referring to FIG. 3, the processing logic may further identify a general policy based on the attributes associated with the workload (block 340). A general policy may be identified based on the general policy matching one or more attributes of the workload. For example, if a workload is associated with a first attribute specifying a geographical location of Europe and a second attribute specifying that the workload includes healthcare data, then a general policy relating to the HIPAA regulation (e.g., a regulation associated with healthcare records or data) may be identified for the workload. Furthermore, a second general policy may be identified based on the first attribute specifying the geographical location of Europe (e.g., a geographical regulation associated with Europe). Thus, one or more general policies may be identified based on the attributes of the workload. The processing logic may further determine security policies based on the general policy or regulation (block 350). For example, security policies that are to be implemented or provisioned on one or more network resources that are to provide the workload and may be used to satisfy requirements of the general policy or regulation may be identified.

Furthermore, the processing logic may implement the security polices for the network resources that will provide the workload (block 360). Examples of the security policies may include, but are not limited to, data security settings or configurations, data leakage settings or configurations, access settings or configurations, network connection settings or configurations, firewall settings or configurations, etc. As an example, a first attribute of the workload may be identified as a first application (e.g., Sharepoint) and a second attribute of the workload may be identified as financial data. Thus, a general policy based on the first application and the identified financial data may be determined to be applicable to the workload. In response to the determination of the general policy, particular security policies to be applied to network resources may be determined. For example, particular firewall settings or configurations may be implemented in order to meet or satisfy the general policy that is based on the first application and the identified financial data. For example, the general policy may implement particular network resources or tiers to be used to provide the first application and how data is to be transferred between the network resources or tiers of the workload. For example, the firewall setting or configuration may specify that the financial data may only be transmitted through a particular network point or between particular network resources.

In another example, a general policy may specify one or more malware settings or configurations for one or more network resources. For example, a first network resource and a second network resource may be identified as network resources that will provide a workload. The attributes of the workload may be identified and a first general policy may be identified as matching the attributes of the workload. The general policy may be translated or mapped to one or more security policies that define a parameter of the network resources. For example, the parameter of the network resource may relate to server hardening (e.g., the process of securing the network resource by reducing its vulnerability to unauthorized use or malware or how the network resource should be treated in response to a detection of the unauthorized use or malware). The parameters of the network resources may then be set to configure a first parameter for the first network resource and a second parameter for the second network resource. For example, if the first network resource is not a critical network resource to provide functionality for the workload, then the parameter of the first network resource may be set or configured so that the first network resource may be powered off or isolated from a network in response to the detection of the unauthorized use or malware. Additionally, the parameter of the second network resource may be set or configured so that an alternative action is performed on the second network resource so that the second network resource may continue to provide functionality for the workload.

Figure 4:
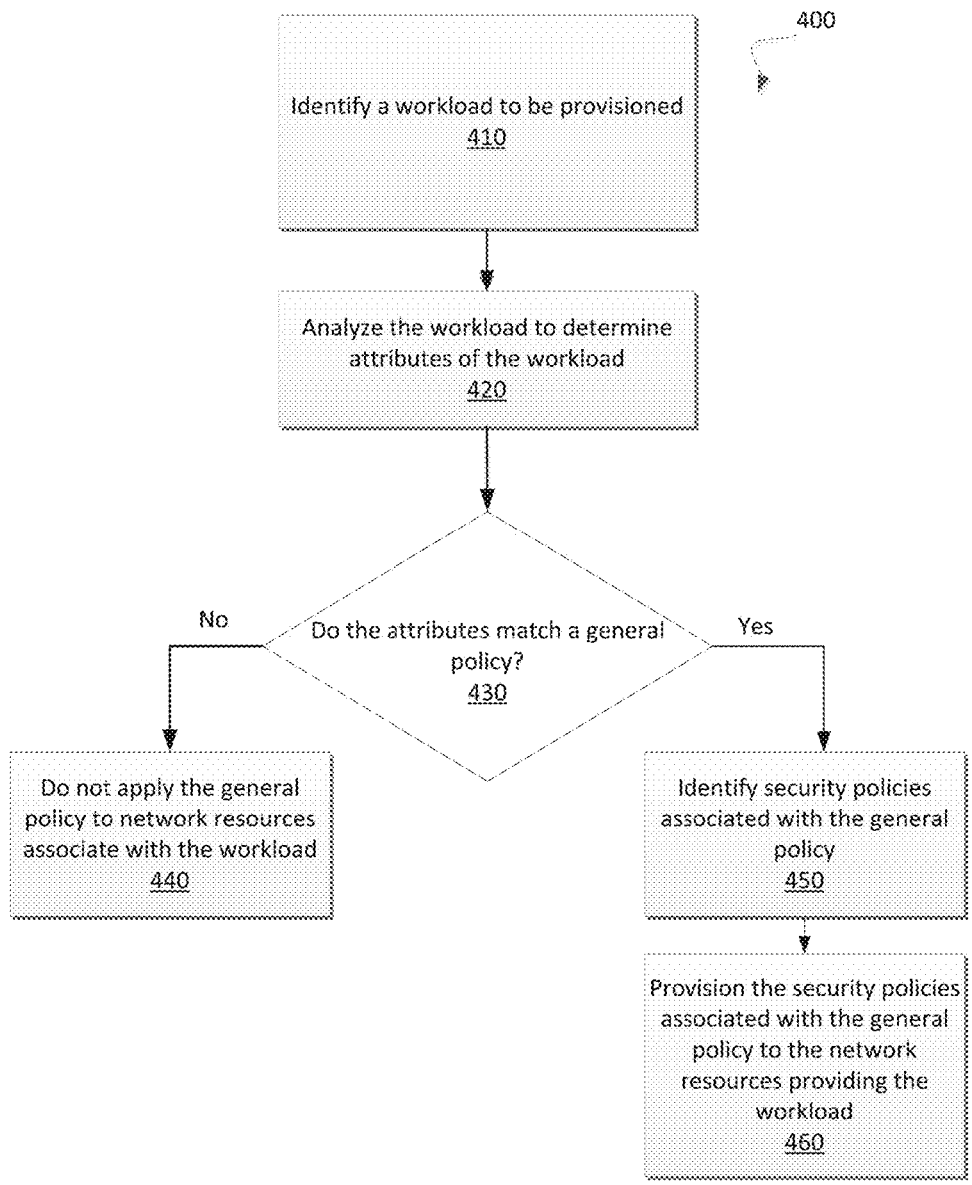
FIG. 4 is a flow diagram to apply or provision security policies based on an identified general policy or regulation in accordance with some embodiments.

FIG. 4 is a flow diagram of an example method 400 to apply or provision security policies based on an identified general policy. The method 400 may be performed by processing logic that may comprise hardware (e.g., a processing device, circuitry, dedicated logic, programmable logic, microcode, etc.), software (e.g., instructions run on a processing device), or a combination thereof. In some embodiments, the method 300 may be performed by a security policy module 140 of FIG. 1 or a security policy module 200 of FIG. 2.

As shown in FIG. 4, the method 400 may begin with the processing logic identifying a workload to be provisioned (block 410). The processing logic may further analyze the workload to determine attributes of the workload (block 420). For example, data associated with the workload may be scanned to determine types of data used or provided by the workload. Furthermore, the processing logic may determine if the attributes of the workload match a general policy (block 430). For example, a first attribute (e.g., a type of data) and a second attribute (e.g., a location) associated with the workload may be received. A general policy may be considered to match the attributes of the workload if at least one condition associated with a general policy is identified as an attribute of the workload. For example, a general policy may include a condition that the general policy should be applied if a workload has a particular type of data. In alternative embodiments, a general policy may include a condition that the general policy should be applied if a workload has a particular type of data and is associated with a particular location. Thus, a workload may be matched to attributes of a workload based on a single attribute that has been identified or based on a combination of attributes of the workload that have been identified. In some embodiments, multiple general policies may be identified for a single workload. For example, a first general policy and a second general policy may be considered to match the various attributes associated with a workload. As an example, a workload's attributes may match with a first general policy (e.g., PCI) and a second general policy (e.g., HIPAA). In such a case, the security policies assigned to the workload may be based on a combination of the first general policy and the second general policy (e.g., security policies to satisfy the requirements of both the first general policy and the second general policy may be applied to the workload). Furthermore, if a conflict exists between the first general policy and the second general policy (e.g., a first security policy associated with the first general policy and a second security policy associated with the second general policy) then the more strict of the general policies or security policies may be applied to the workload. For example, in some embodiments, a level of strictness may be associated with the security policies such that the first security policy may be associated with a first level and the second security policy may be associated with the second level where a higher level indicates a more strict security policy. Thus, in such a case where a first security policy and a second security policy are in conflict, the second security policy associated with the more strict level may be applied to the workload.

If the attributes of the workload do not match the general policy then the general policy may not be applied to network resources associated with the workload (block 440). However, if the attributes of the workload do match the general policy then the general policy may be applied to network resources associated with the workload. For example, security policies associated with the general policy that matches one or more attributes of the workload may be identified (block 450). Furthermore, the security policies associated with the general policy may be provisioned to the network resources that provide the workload (block 460). In some embodiments, the applying of the security policies to the network resources may result in the changing of a configuration or a setting associated with the network resources. For example, a security policy that is applied to a network resource may change or modify a configuration setting associated with a network resource that corresponds to how the network resource may manage data, firewall settings of the network resource, etc.

Figure 5:
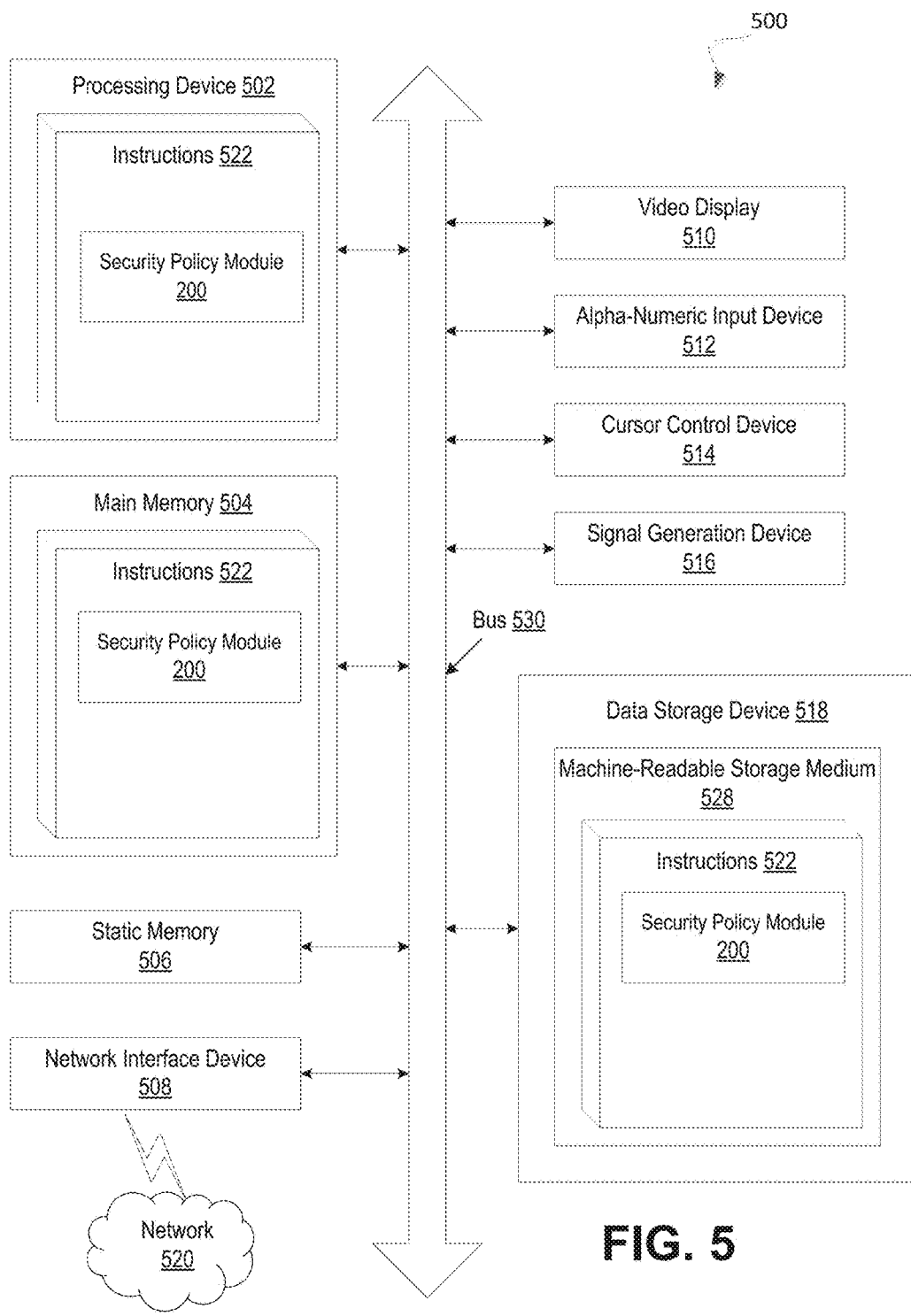
FIG. 5 is a block diagram of an example computer system that may perform one or more of the operations described herein.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528 (also known as a computer-readable medium) on which is stored one or more sets of instructions or software 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting machine-readable storage media.

In one implementation, the instructions 522 include instructions for a security policy module (e.g., security policy module 140 of FIG. 1 or security policy module 200 of FIG. 2) and/or a software library containing methods that call modules or sub-modules in a security policy module. While the machine-readable storage medium 528 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   identifying a workload to be provided by one or more network resources;
   analyzing the workload to determine one or more attributes of the workload, wherein the one or more attributes correspond to a type of data and a software application used by the workload;
   identifying a general policy based on the determined one or more attributes corresponding to the type of data and the software application used by the workload, wherein the identified general policy is based on at least one of an industry standard or a government regulation, wherein the identified general policy comprises a first general policy associated with a first level of strictness and a second general policy associated with a second level of strictness higher than the first level of strictness;
   determining, by a processing device, based on the identified general policy, one or more security policies to apply to the one or more network resources that provide the workload, wherein the one or more security policies satisfy one or more requirements associated with the identified general policy, wherein the one or more security policies satisfy the second level of strictness; and
   applying the determined one or more security policies to the one or more network resources that provide the workload, wherein the applying of the determined one or more security policies modifies a configuration of the one or more network resources that provide the workload to satisfy the one or more requirements associated with the identified general policy.

2. The method of claim 1, wherein the one or more attributes comprises a geographical location associated with the workload.

3. The method of claim 1, wherein the one or more security policies comprises at least one of a network security policy, data policy, or a malware policy.

4. The method of claim 1, wherein the identified workload has not yet been provided by the one or more network resources.

5. The method of claim 1, wherein the identifying of the general policy based on the determined one or more attributes of the workload comprises matching one or more conditions associated with the general policy with at least one attribute of the one or more attributes of the workload.

6. A system comprising:
   a memory; and
   a processing device coupled with the memory to:
   identify a workload to be provided by one or more network resources;
   analyze the workload to determine one or more attributes of the workload, wherein the one or more attributes correspond to a type of data and a software application used by the workload;
   identify a general policy based on the determined one or more attributes corresponding to the type of data and the software application used by the workload, wherein the identified general policy is based on at least one of an industry standard or a government regulation, wherein the identified general policy comprises a first general policy associated with a first level of strictness and a second general policy associated with a second level of strictness higher than the first level of strictness;
   determine, based on the identified general policy, one or more security policies to apply to the one or more network resources that provide the workload, wherein the one or more security policies satisfy one or more requirements associated with the identified general policy, wherein the one or more security policies satisfy the second level of strictness; and
   apply the determined one or more security policies to the one or more network resources that provide the workload, wherein the applying of the determined one or more security policies modifies a configuration of the one or more network resources that provide the workload to satisfy the one or more requirements associated with the identified general policy.

7. The system of claim 6, wherein the one or more attributes comprises a geographical location associated with the workload.

8. The system of claim 6, wherein the one or more security policies comprises at least one of a network security policy, data policy, or a malware policy.

9. The system of claim 6, wherein the identified workload has not yet been provided by the one or more network resources.

10. The system of claim 6, wherein the identifying of the general policy based on the determined one or more attributes of the workload comprises matching one or more conditions associated with the general policy with at least one attribute of the one or more attributes of the workload.

11. A non-transitory computer readable storage medium including instructions that, when executed by a processing device, cause the processing device to perform operations comprising:

identifying a workload to be provided by one or more network resources;

analyzing the workload to determine one or more attributes of the workload, wherein the one or more attributes correspond to a type of data and a software application used by the workload;

identifying a general policy based on the determined one or more attributes corresponding to the type of data and the software application used by the workload, wherein the identified general policy is based on at least one of an industry standard or a government regulation, wherein the identified general policy comprises a first general policy associated with a first level of strictness and a second general policy associated with a second level of strictness higher than the first level of strictness;

determining, by the processing device, based on the identified general policy, one or more security policies to apply to the one or more network resources that provide the workload, wherein the one or more security policies satisfy one or more requirements associated with the identified general policy, wherein the one or more security policies satisfy the second level of strictness; and applying the determined one or more security policies to the one or more network resources that provide the workload, wherein the applying of the determined one or more security policies modifies a configuration of the one or more network resources that provide the workload to satisfy the one or more requirements associated with the identified general policy.

12. The non-transitory computer readable storage medium of claim 11, wherein the one or more attributes comprises a geographical location associated with the workload.

13. The non-transitory computer readable storage medium of claim 11, wherein the one or more security policies comprises at least one of a network security policy, data policy, or a malware policy.

14. The non-transitory computer readable storage medium of claim 11, wherein the identified workload has not yet been provided by the one or more network resources.

15. The non-transitory computer readable storage medium of claim 11, wherein the identifying of the general policy based on the determined one or more attributes of the workload comprises matching one or more conditions associated with the general policy with at least one attribute of the one or more attributes of the workload.

* * * * *